United States Patent [19]

Ogura et al.

[11] Patent Number: 5,617,275

[45] Date of Patent: Apr. 1, 1997

[54] THIN FILM HEAD HAVING A CORE COMPRISING FE-N-O IN A SPECIFIC ATOMIC COMPOSITION RATIO

[75] Inventors: Takashi Ogura, Daito; Minoru Kume, Kadoma, both of Japan

[73] Assignee: Sanyo Electric Co., Ltd., Moriguchi, Japan

[21] Appl. No.: 430,393

[22] Filed: Apr. 28, 1995

[30] Foreign Application Priority Data

May 2, 1994 [JP] Japan ................................... 6-093492

[51] Int. Cl.$^6$ ....................................................... G11B 5/31
[52] U.S. Cl. .......................... 360/113; 360/125; 360/126; 428/692; 428/693; 428/704; 428/900
[58] Field of Search ................................... 360/113, 125, 360/126; 428/692, 693, 704, 900

[56] References Cited

U.S. PATENT DOCUMENTS

| | | | |
|---|---|---|---|
| 4,969,962 | 11/1990 | Watanabe et al. | 148/306 |
| 4,990,361 | 2/1991 | Yasunaga et al. | 427/36 |
| 5,073,214 | 12/1991 | Hirota et al. | 148/306 |
| 5,302,469 | 4/1994 | Sugenoya et al. | 428/694 T |
| 5,309,305 | 5/1994 | Nepela et al. | 360/113 |
| 5,466,539 | 11/1995 | Takayama | 428/611 |

FOREIGN PATENT DOCUMENTS

| | | |
|---|---|---|
| 63-299219 | 12/1988 | Japan . |
| 142108 | 2/1989 | Japan . |
| 3116910 | 5/1991 | Japan . |
| 3129805 | 6/1991 | Japan . |
| 3166705 | 7/1991 | Japan . |
| 3232206 | 10/1991 | Japan . |
| 3250706 | 11/1991 | Japan . |
| 3250707 | 11/1991 | Japan . |
| 3270202 | 12/1991 | Japan . |
| 3270204 | 12/1991 | Japan . |
| 3288410 | 12/1991 | Japan . |
| 461306 | 2/1992 | Japan . |
| 461307 | 2/1992 | Japan . |
| 461308 | 2/1992 | Japan . |
| 484403 | 3/1992 | Japan . |
| 4162505 | 6/1992 | Japan . |
| 4236405 | 8/1992 | Japan . |

OTHER PUBLICATIONS

Structural and soft magnetic properties of nitrogen added iron films by sputter depoisition, by K. Kijima et al (Sony Information Systems Research Center, Nov. 1987 p. 230.

*Primary Examiner*—Stevan A. Resan
*Attorney, Agent, or Firm*—W. G. Fasse; W. F. Fasse

[57] ABSTRACT

A magnetic thin film head includes a soft magnetic alloy thin film having in a composition expressed by the formula $Fe_xN_yO_z$, wherein each of X, Y and Z represents an atomic composition ratio, and preferably having four phases including an iron oxide expressed as $Fe_2O_3$, iron nitrides expressed as $Fe_4N$ and $Fe_3N$ respectively, and α-Fe. X, Y and Z appearing in the composition formula are preferably in the following relations:

$0.005 \leq Y \leq 0.12$ $0.005 \leq Z \leq 0.12$ $X+Y+Z=1$

15 Claims, 18 Drawing Sheets

THIN FILM HEAD HAVING A CORE COMPRISING FE-N-O IN A SPECIFIC ATOMIC COMPOSITION RATIO

BACKGROUND OF THE INVENTION

1. Field of the Invention

The present invention relates to a soft magnetic alloy thin film which is suitable for a magnetic head for high density magnetic recording, and more particularly, it relates to a soft magnetic alloy thin film suitable for a magnetic head such as a thin film magnetic head which is manufactured by a low-temperature process.

2. Description of the Background Art

In general, magnetic heads comprising ferromagnetic metal films which are arranged at least in the vicinity of gaps of magnetic cores for improving the recording density have been proposed for use in a computer memory device and a high density magnetic recording/reproducing apparatus such as a video tape recorder (VTR).

While permalloy (Fe-Ni alloy), Sendust (Fe-Al-Si alloy), a Co amorphous alloy and Sofmax (Fe-Ga-Si alloy) have generally been put into practice as materials for ferromagnetic metal films, the coercive force of a recording medium is now being increased for further improvement of the recording density, and improvement of recordability and overwritability is awaited for a recording head. In order to improve recordability and overwritability, it is necessary to increase the saturation magnetic flux density of the ferromagnetic metal film. Under such circumstances, a soft magnetic alloy thin film having a high saturation magnetic flux density is presently being studied.

For example, it has been reported that an Fe-N film with a high saturation magnetic flux density exhibits excellent soft magnetic properties as compared with an Fe film ("Structure and Magnetic Properties of Nitrogen-Added Soft Magnetic Fe Sputtering Film", Digests of the 11th Annual Conference on Magnetics in Japan, p. 230, 3PB-8, Sony Information Systems Research Center). However, this film is disadvantageous in practice due to its inferior heat resistance against a temperature for glass bonding which is employed in a step of manufacturing a magnetic head. As a means for solving this problem, a material is known, which has a high heat resistance and a high saturation magnetic flux density, such as that disclosed in Japanese Patent Laying-Open No. 63-299219 (1988) or 64-42108 (1989), for example, which is improved in heat resistance through addition of a small amount of an element such as Nb, Ta, Zr, Al or Ga to an Fe-N film. This is a soft magnetic alloy film having an extremely high saturation magnetic flux density of at least 18 kG.

A magnetic film which is applied to a head such as a thin film head requiring no bonding step employing glass having a high melting point must exhibit excellent soft magnetic properties without heat treatment. However, a well-known soft magnetic film consisting of Fe-N or the like exhibits a coercive force of about 1 Oe at best, in the as-prepared state, although it has a high saturation magnetic flux density of about 20 kG. Thus, a soft magnetic alloy film exhibiting a coercive force of not more than 0.5 Oe, which is a value applicable to a magnetic head, in the as-prepared state without heat treatment is not yet known in the art.

SUMMARY OF THE INVENTION

An object of the present invention is to provide a soft magnetic alloy thin film which can exhibit a low coercive force (Hc) without a high-temperature heat treatment.

The soft magnetic alloy thin film according to the present invention is expressed as $Fe_xN_yO_z$ wherein each of X, Y and Z represents an atomic composition ratio.

According to the present invention, the soft magnetic alloy thin film preferably has at least one of phases of iron oxides, iron nitrides and iron. More preferably, the soft magnetic alloy thin film has at least one phase of $Fe_2O_3$, $Fe_4N$, $Fe_3N$ and α-Fe, and more preferably, the film has all of these four phases.

According to the present invention, further, X, Y and Z appearing in the aforementioned composition formula are in the following relations:

$0 < Y \leq 0.12$ $0 < Z \leq 0.12$ $X + Y + Z \leq 1$

More preferably, X, Y and Z appearing in the composition formula are in a relation of $X+Y+Z=1$.

A soft magnetic thin film according to a preferred aspect of the present invention is expressed in a composition formula of $Fe_xN_yO_z$, and has four phases of an iron oxide which is expressed as $Fe_2O_3$, iron nitrides which are expressed as $Fe_4N$ and $Fe_3N$, and α-Fe, where X, Y and Z are in the following relations:

$0.005 \leq Y \leq 0.12$ $0.005 \leq Z \leq 0.12$ $X+Y+Z=1$

If Y and Z are less than 0.005, i.e., if the proportions of nitrogen and oxygen are less than 0.5 atomic percent, then the crystal grains are insufficiently refined and reduction of effective magnetic anisotropy cannot be attained, and a hence the film cannot exhibit sufficient magnetic properties. If Y and Z exceed 0.12, i.e., when the proportions of nitrogen and oxygen are in excess of 12 atomic percent, on the other hand, this leads to grain growth of the nitrides and the oxide of iron and an increase of magnetic striction, and hence sufficient soft magnetic properties cannot be attained.

In the soft magnetic alloy thin film according to the present invention, crystal grains of α-Fe are preferably not more than 200Å in grain size.

The soft magnetic alloy thin film according to the present invention can be prepared by reactive sputtering, for example. In this sputtering, the nitrogen partial pressure ($P_N$), the oxygen partial pressure ($P_O$) and the total gas pressure ($P_{total}$) are preferably in the following relations:

$2.2\% \leq P_N/P_{total} \times 100 \leq 4.0\%$ $0.1\% \leq P_O/P_{total} \times 100 \leq 1.0\%$ More preferably, these pressures are in the following relations:

$2.7\% \leq P_N/P_{total} \times 100 \leq 3.6\%$ $0.3\% \leq P_O/P_{total} \times 100 \leq 0.8\%$ When the total gas pressure is 4.5 mTorr, therefore, the nitrogen partial pressure is preferably 0.1 to 0.17 mTorr, and more preferably 0.125 to 0.14 mTorr. On the other hand, the oxygen partial pressure is preferably 0.004 to 0.45 mTorr, and more preferably 0.015 to 0.036 mTorr.

In the method according to the present invention, the substrate temperature in sputtering is preferably at least 150° C. and not more than 200° C.

It is generally known that crystal grains of iron are refined when nitrogen is added to the iron, so that it exhibits soft magnetic properties due to a reduction of effective magnetic anisotropy. In a soft magnetic alloy film which is prepared with addition of only nitrogen, however, the coercive force is about 1 Oe at best as hereinabove described, and the film cannot be applied to a magnetic head.

As to the relation between the nitrogen content and the coercive force, the latter is gradually reduced as the former is increased, and is then relatively abruptly increased after reaching a minimum value of about 1 Oe. This is conceivably because the coercive force is minimized since the crystal grains are refined with an increase of the nitrogen content, which reduces the effective magnetic anisotropy, and is then abruptly increased since magnetic striction is increased and grain growth of a nitride of iron takes place when the nitrogen content is further increased.

According to the present invention, not only nitrogen but also oxygen is added to avoid the aforementioned problem of the conventional film containing only nitrogen, whereby excellent soft magnetic properties can be attained with lower coercive force of not more than 0.5 Oe, for example.

The soft magnetic alloy thin film according to the present invention, which is expressed in the composition formula of $Fe_xN_yO_z$, exhibits low coercive force in the as-prepared state due to the oxygen contained therein, has low magnetic striction, and can be provided with a high saturation magnetic flux density.

While Japanese Patent Laying-Open Nos. 3-116910 (1991), 3-129805 (1991), 3-166705 (1991), 3-232206 (1991), 3-250706 (1991), 3-250707 (1991), 3-270202 (1991), 3-270204 (1991), 3-288410 (1991), 4-61306 (1992), 4-61307 (1992), 4-61308 (1992), 4-84403 (1992), 4-162505 (1992), 4-236405 (1992) and the like disclose alloys of iron, nitrogen and oxygen, every one of these alloys is adapted to improve in thermal stability through the addition of a fourth element thereto, and does not exhibit sufficient soft magnetic properties in a process with a temperature of not more than 200° C., unlike the alloy according to the present invention.

The soft magnetic alloy thin film according to the present invention has a high saturation magnetic flux density of 20 kG, and can exhibit a low coercive force of not more than 0.5 Oe, a high magnetic permeability of at least 3000 at 1 MHz and a low magnetic striction in the as-prepared state without specific heat treatment. Thus, this film can be applied to a thin film magnetic head which is manufactured by a low-temperature process.

A thin film head according to the present invention comprises an MR element for reproducing signals, and an inductive magnetic head element for recording signals. The inductive magnetic head element has a coil part, and upper and lower cores which are provided on upper and lower portions of the coil part respectively. In the thin film head according to the present invention, at least one of the upper and lower cores is formed by the aforementioned soft magnetic alloy thin film according to the present invention.

In the thin film head according to the present invention, it is not necessary to perform a heat treatment on the MR element after it has been manufactured, which would deteriorate the MR element, since the magnetic head employs the soft magnetic alloy thin film of the invention, which requires no heat treatment.

According to another aspect of the present invention, an inductive thin film magnetic head according to the present invention comprises a coil part, and upper and lower cores which are provided on upper and lower portions of the coil part respectively. The inductive thin film magnetic head according to this aspect of the invention is adapted to record and reproduce information. According to this aspect, at least one of the upper and lower cores is formed by the aforementioned soft magnetic alloy thin film according to the present invention.

The soft magnetic alloy thin film according to the present invention exhibits low coercive force of not more than 0.5 Oe and high magnetic permeability without specific heat treatment as hereinabove described, and is particularly effectively applied to an inductive thin film magnetic head having a coil part which is formed by stacking a plurality of coil layers that are insulated from each other by organic resin films. Therefore, the inductive thin film magnetic head can be manufactured without heat treatment, which would exert a bad influence on the organic resin films provided in the coil part.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS AND OF THE BEST MODE OF THE INVENTION

The present invention is now described in further detail with reference to an Example and embodiments thereof.

In the following Example, magnetic alloy thin films were prepared by RF sputtering. These magnetic alloy thin films were formed on non-magnetic substrates to be about 1.5 μm in thickness.

Targets were prepared from Fe of 99.99% purity, to be 29 cm in diameter and 5 mm in thickness. Reactive gas for reactive sputtering was prepared by mixing nitrogen gas and/or oxygen gas into Ar gas. Magnetic films of various compositions were prepared under conditions of total gas pressures of 4 to 9 mTorr, substrate temperatures of 150° to 200° C., and applied RF power levels of 1.2 to 1.5 kW in film formation.

Coercive force values (Hc) and saturation magnetic flux densities (Bs) were measured through VSM. Magnetic permeability values (μ) were measured by an inductance method employing a ferrite yoke. All magnetic films were subjected to measurement in their respective as-prepared state, without heat treatment.

The compositions were measured by EPMA and ESCA, with possible errors of about ±20%. Phases of the magnetic films were identified by X-ray diffraction and ESCA.

Figure 2:
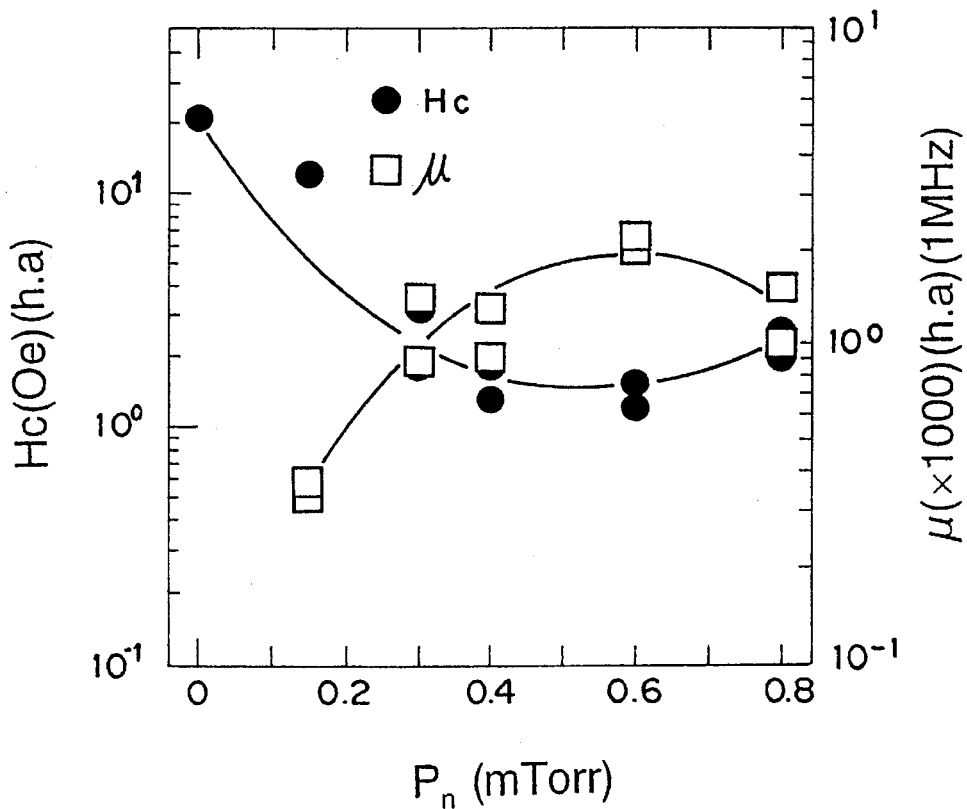
FIG. 2 illustrates nitrogen partial pressure dependence in an Fe-N film.

FIG. 2 illustrates relations between coercive force and magnetic permeability of an Fe-N film and a nitrogen partial pressure in formation of the Fe-N thin film. This film was formed under conditions of a substrate temperature of 200° C., a total gas pressure of 9 mTorr and RF applied power of 1.5 kW. As shown in FIG. 2, the coercive force is gradually reduced as the nitrogen partial pressure is increased, and a coercive force of 1.2 Oe and a magnetic permeability of 2000, which are the best soft magnetic properties, are attained at a nitrogen partial pressure of 0.6 mTorr. It is understood that the soft magnetic properties are deteriorated when the nitrogen partial pressure exceeds 0.6 mTorr.

Figure 1:
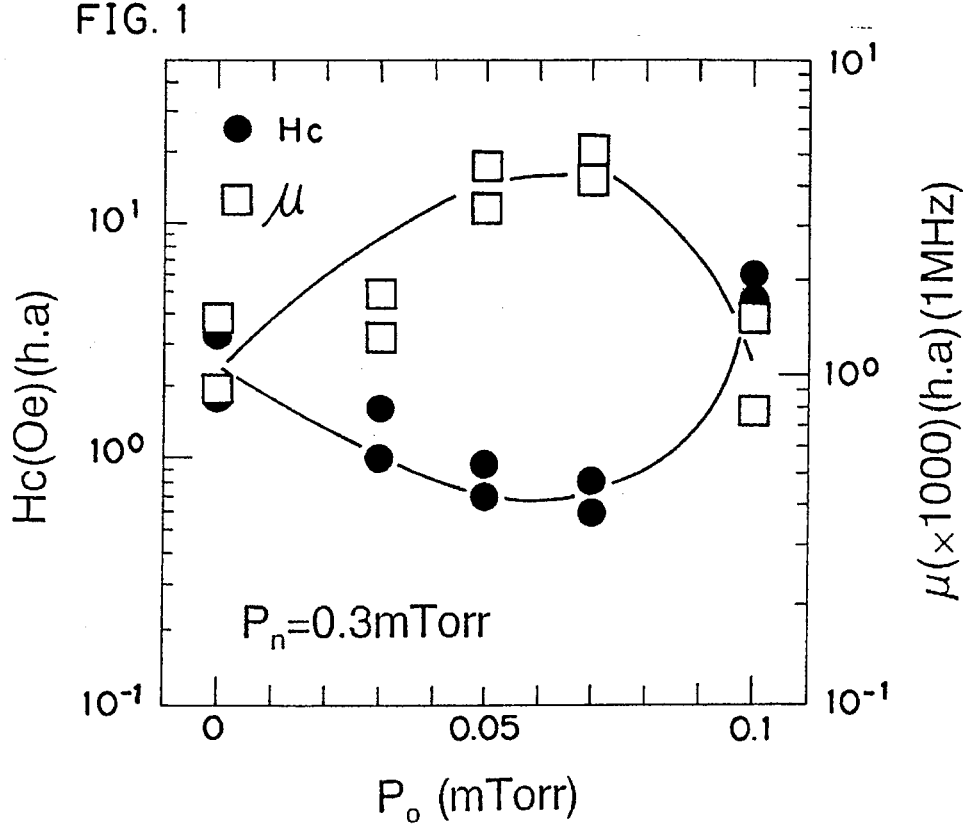
FIG. 1 illustrates oxygen partial pressure dependence in an Fe-N-O film according to the present invention.

FIG. 1 illustrates relations between coercive force and magnetic permeability of a Fe-N-O film and an oxygen partial pressure. This film was formed at a constant nitrogen partial pressure of 0.3 mTorr, under the same conditions as those for the aforementioned Fe-N film. As shown in FIG. 1, the coercive force is gradually reduced as the oxygen partial pressure is increased, and a coercive force of 0.6 Oe and a magnetic permeability of 5000, which are the best soft magnetic properties, are attained at an oxygen partial pressure of 0.6 mTorr.

These values cannot be attained in the Fe-N film. In order to obtain a thin film exhibiting soft magnetic properties with coercive force of not more than 0.5 Oe, optimum film forming conditions were studied. Experiments were made on the film forming conditions with parameters of the total gas pressure, the applied power, the substrate temperature and the like.

Figure 3:
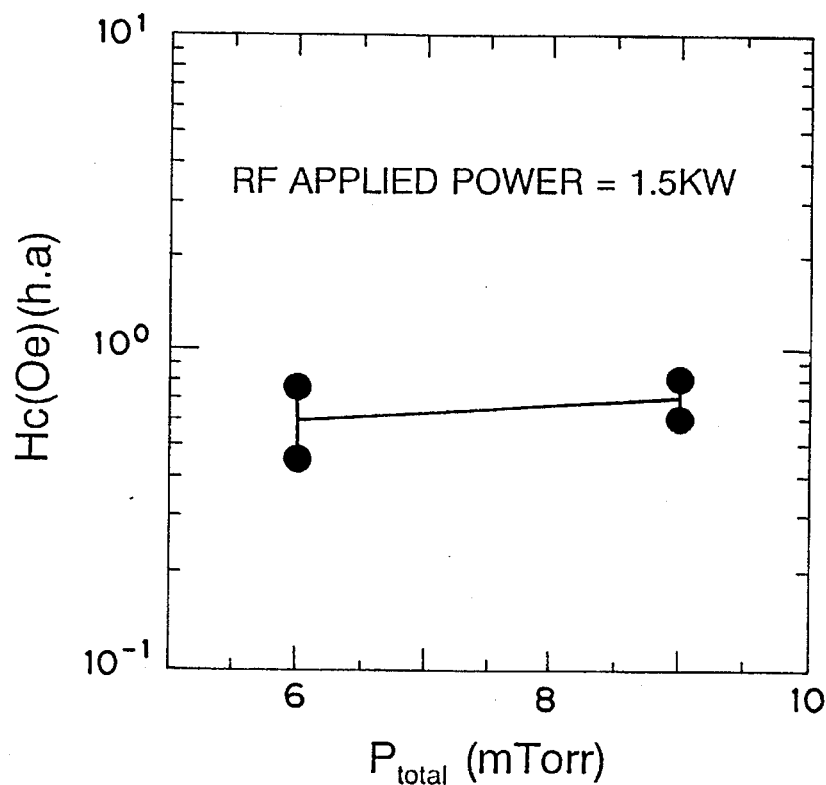
FIG. 3 illustrates total gas pressure dependence in an Fe-N-O film according to the present invention.

FIG. 3 illustrates the relation between coercive force of an Fe-N-O film and a total gas pressure. The Fe-N-O film was formed at different total gas pressures, and was subjected to measurement of the coercive force. While nitrogen gas and oxygen gas were at the same flow rates, partial pressures thereof were varied due to the different total gas pressure. Other film forming conditions were absolutely identical to those in FIG. 2. As shown in FIG. 3, the best coercive force of 0.45 Oe is attained at a total gas pressure of 6 mTorr.

Figure 4:
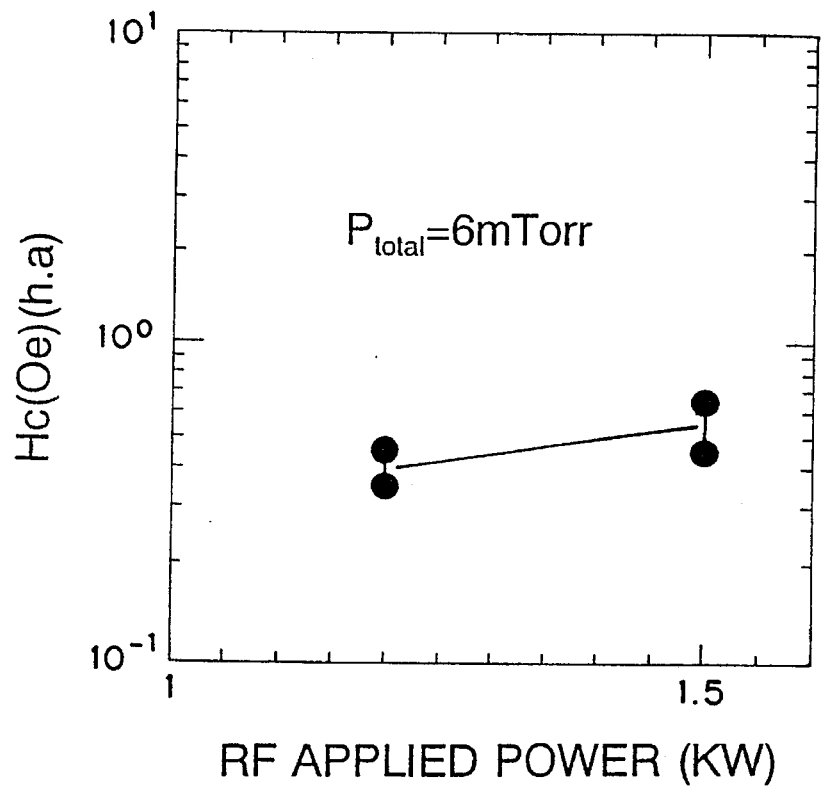
FIG. 4 illustrates applied power dependence in an Fe-N-O film according to the present invention.

FIG. 4 illustrates the relation between coercive force of an Fe-N-O film and RF applied power. The film was formed at a constant total gas pressure of 6 mTorr under film forming conditions identical to those in FIG. 2. As shown in FIG. 4, the best coercive force of 0.35 Oe is attained at an applied power of 1.2 kW.

Figure 5:
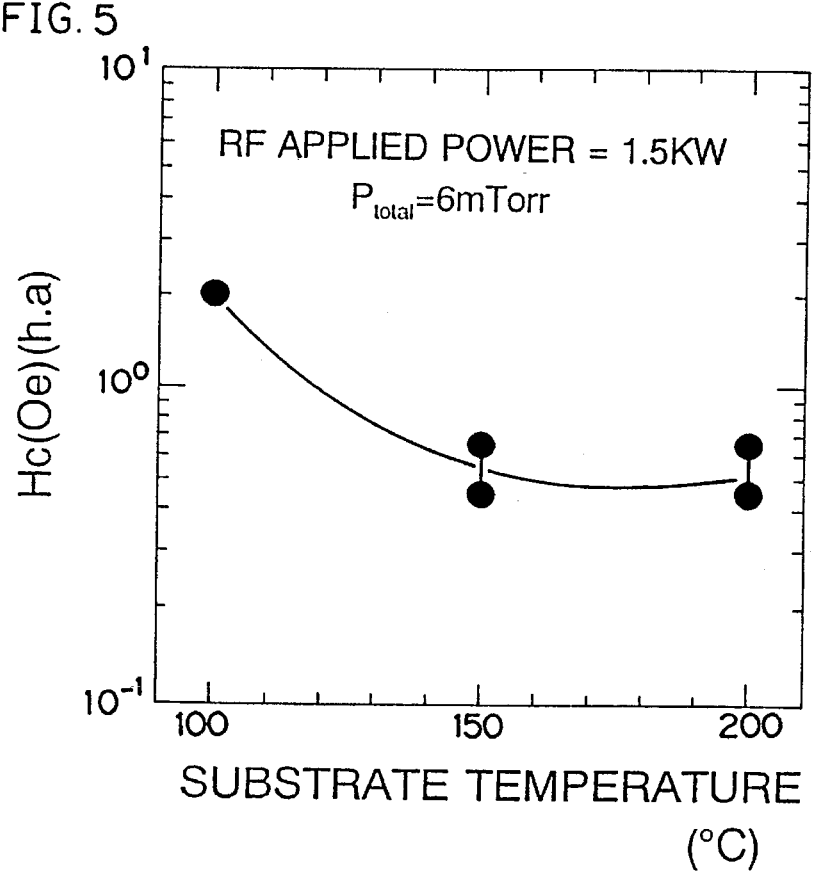
FIG. 5 illustrates substrate temperature dependence in an Fe-N-O film according to the present invention.

FIG. 5 illustrates the relation between coercive force of an Fe-N-O film and a substrate temperature. The film was formed with RF applied power of 1.5 kW and a total gas pressure of 6 mTorr, under film forming conditions identical to those in FIG. 2. As shown in FIG. 5, the coercive force is increased at a substrate temperature of 100° C., while the same is at low levels at substrate temperatures of 200° C. and 150° C.

Figure 6:
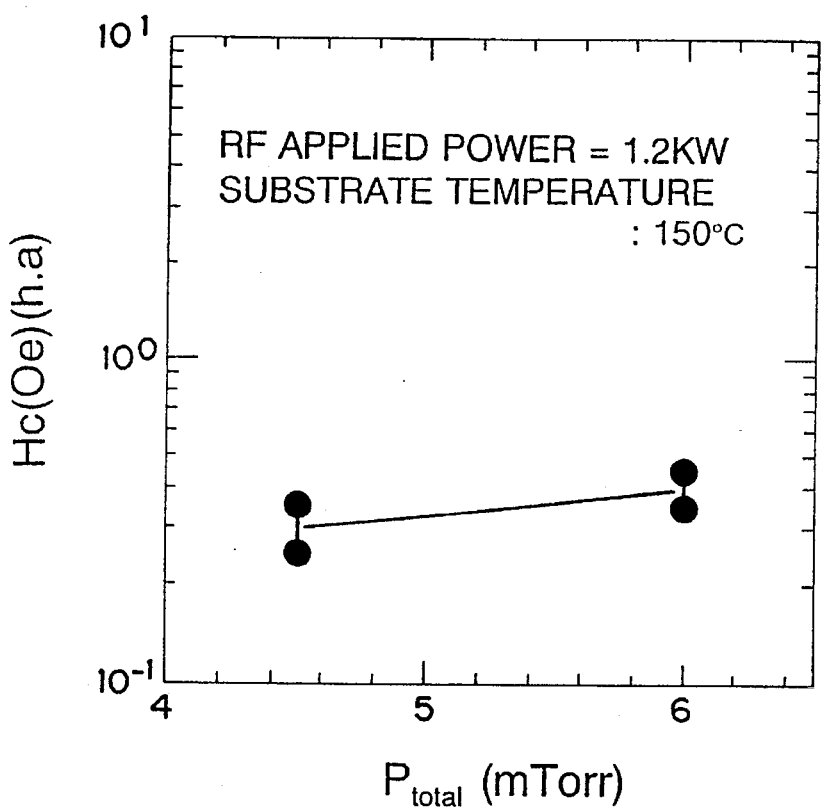
FIG. 6 illustrates total gas pressure dependence in an Fe-N-O film according to the present invention.

FIG. 6 illustrates total gas pressure dependence at the best RF applied power of 1.2 kW and the best substrate temperature of 150° C. attained in accordance with the results of experiments shown in FIGS. 4 and 5. Also in this figure, nitrogen gas and oxygen gas are at the same flow rates while partial pressures thereof are varied due to the different total gas pressure. As shown in FIG. 6, the best coercive force of 0.25 Oe is attained at a total gas pressure of 4.5 mTorr.

Table 1 shows the properties of a soft magnetic alloy thin film, which were attained as the best properties in an Fe-N-O film. For the purpose of comparison, Table 1 also shows the properties of another soft magnetic alloy thin film, which were attained as the best properties in an Fe-N film.

TABLE 1

|  | BS (kG) | Hc (Oe) (h · a) | μ (h · a) (1 MHz) |
|---|---|---|---|
| Fe—N—O | 20.0 | 0.25 | 3500 |
| Fe—N | 20.0 | 1.20 | 2000 |

While experiments were also made on Fe-N films under various film forming conditions for optimizing the film forming conditions similarly to the aforementioned Fe-N-O films, it was impossible to obtain a soft magnetic alloy thin film exhibiting a coercive force of not more than 1 Oe.

Phases of the Fe-N-O film according to the present invention are now described. As to three types of alloy thin films, i.e., respective soft magnetic alloy thin films (1) (Fe-N), (2) (Fe-N-O) and (3) (Fe-N-O) which were formed at oxygen partial pressures of 0 mTorr, 0.07 mTorr and 0.1 mTorr respectively, phases were identified by ESCA. These films were formed under conditions of a total gas pressure of 9 mTorr, RF applied power of 1.5 kW, a substrate temperature of 200° C., Ar gas flow rate of 30 sccm, a nitrogen gas flow rate of 1.85 sccm, a nitrogen gas partial pressure of 0.3 mTorr, oxygen gas flow rates of 0.60 sccm and 1.05 sccm for the films (2) and (3) respectively, and oxygen partial pressures of 0.07 mTorr and 0.1 mTorr for the films (2) and (3) respectively.

Figure 7B:
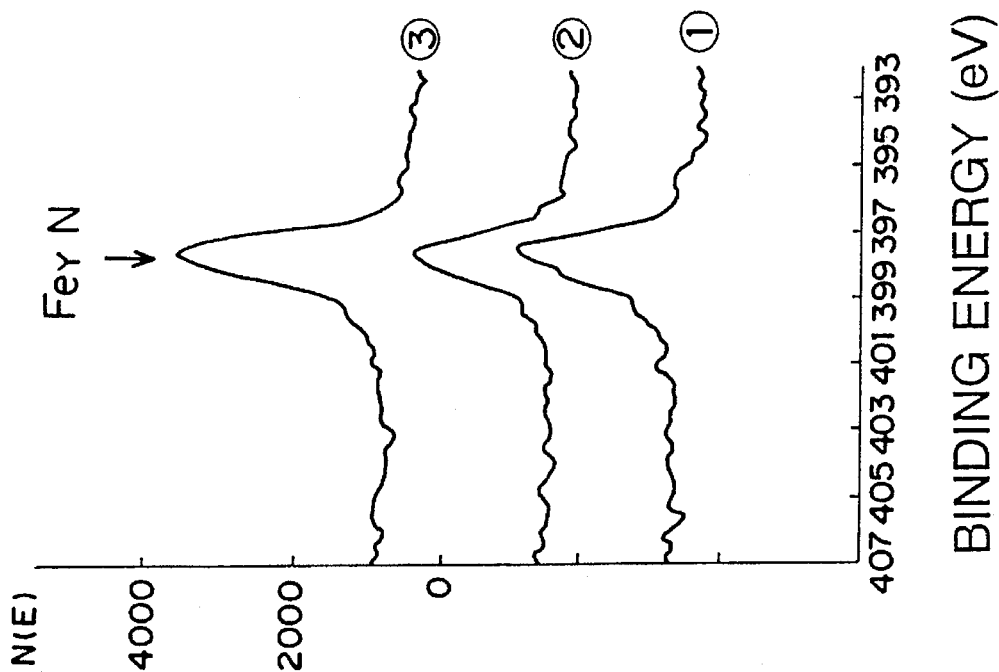
FIGS. 7(a) and 7(b) illustrate results of XPS analysis made on samples of the Fe-N-O film according to the present invention.
Figure 7A:
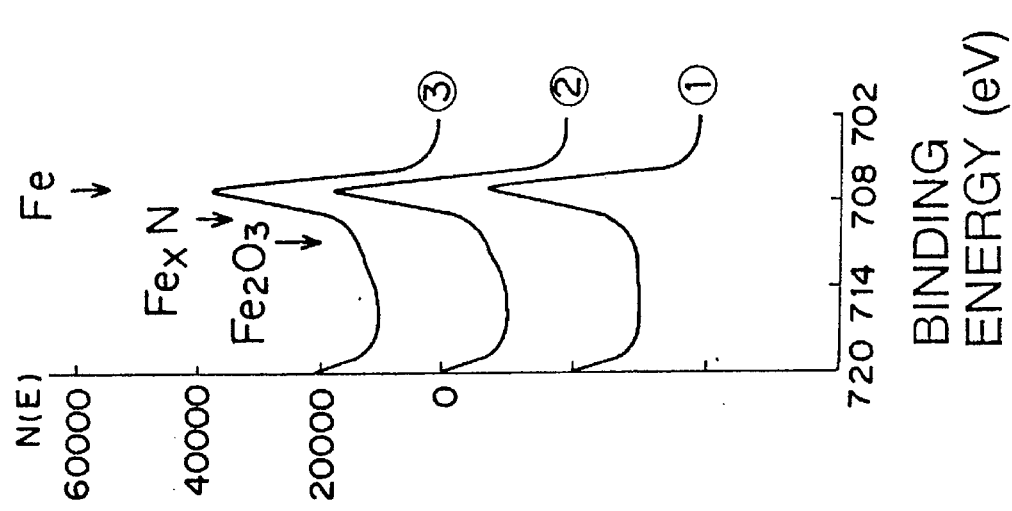

FIGS. 7(a) and 7(b) are spectra showing the results of ESCA analysis made on the thin films (1) to (3). As shown in FIGS. 7(a) and 7(b), Fe and nitrides of Fe in two states were confirmed in the Fe-N film (1), while Fe, nitrides of Fe in two states and $Fe_2O_3$ were confirmed in each of the Fe-N-O films (2) and (3). Table 2 shows the results, wherein the symbol O means the phase is present and the symbol — means the phase is not present.

TABLE 2

|  | α-Fe | $Fe_xN$ | $Fe_yN$ | $Fe_2O_3$ |
|---|---|---|---|---|
| (1) | O | O | O | — |
| (2) | O | O | O | O |
| (3) | O | O | O | O |

Figure 8:
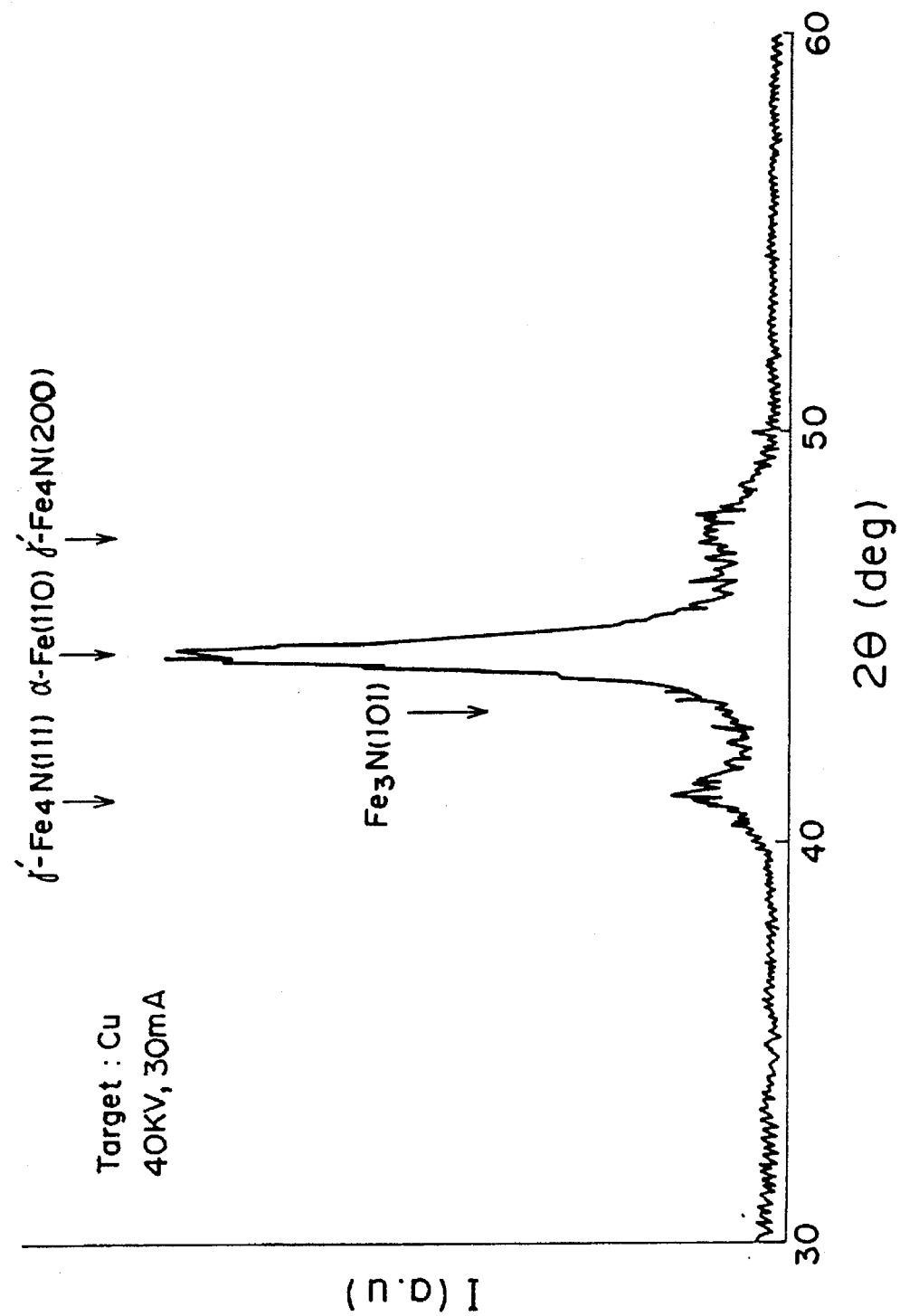
FIG. 8 illustrates results of X-ray diffraction analysis made on the samples of the Fe-N-O film according to the present invention.

The two states of the nitrides of Fe confirmed in each of the films (1) to (3), which could not be determined by ESCA, were identified by X-ray diffraction. FIG. 8 is an X-ray diffraction spectrum showing the results. As shown in FIG. 8, it was confirmed that the nitrides of Fe were $Fe_4N$ and $Fe_3N$ respectively.

Consequently, it has been recognized that the inventive soft magnetic alloy thin film (2) exhibiting low coercive force is in a structure having four phases of Fe, $Fe_4N$, $Fe_3N$ and $Fe_2O_3$. It has also been recognized from the half-band width at the peak of α-Fe (110) in the X-ray diffraction that crystal grain sizes of the inventive soft magnetic alloy thin film exhibiting excellent soft magnetic properties are not more than 200Å.

Compositions are now described. The films (1), (2) and (3) were formed at a nitrogen partial pressure $P_N$ of 0.3 mTorr with different oxygen partial pressures, while nitrogen and oxygen compositions of the films are different from each other. The film (1) has an oxygen composition of 0 (at. %) due to the oxygen partial pressure $P_O$ of 0.00 mTorr. According to quantitative analysis of EPMA and ESCA, the film (2) has a nitrogen composition of 4 to 8 (at. %) and an oxygen composition of 5 to 8 (at. %), while the film (3) has a nitrogen composition of 13 to 15 (at. %) and an oxygen composition of 13 to 15 (at. %). As hereinabove described, quantitative values are dispersed even when the analysis is made through both EPMA and ESCA.

As clearly understood from FIG. 1, an effect of improvement is attained when the oxygen partial pressure is present. Thus, it is understood possible to attain the effect of the present invention by introducing nitrogen and oxygen into the film within the inventive ranges.

Figure 9:
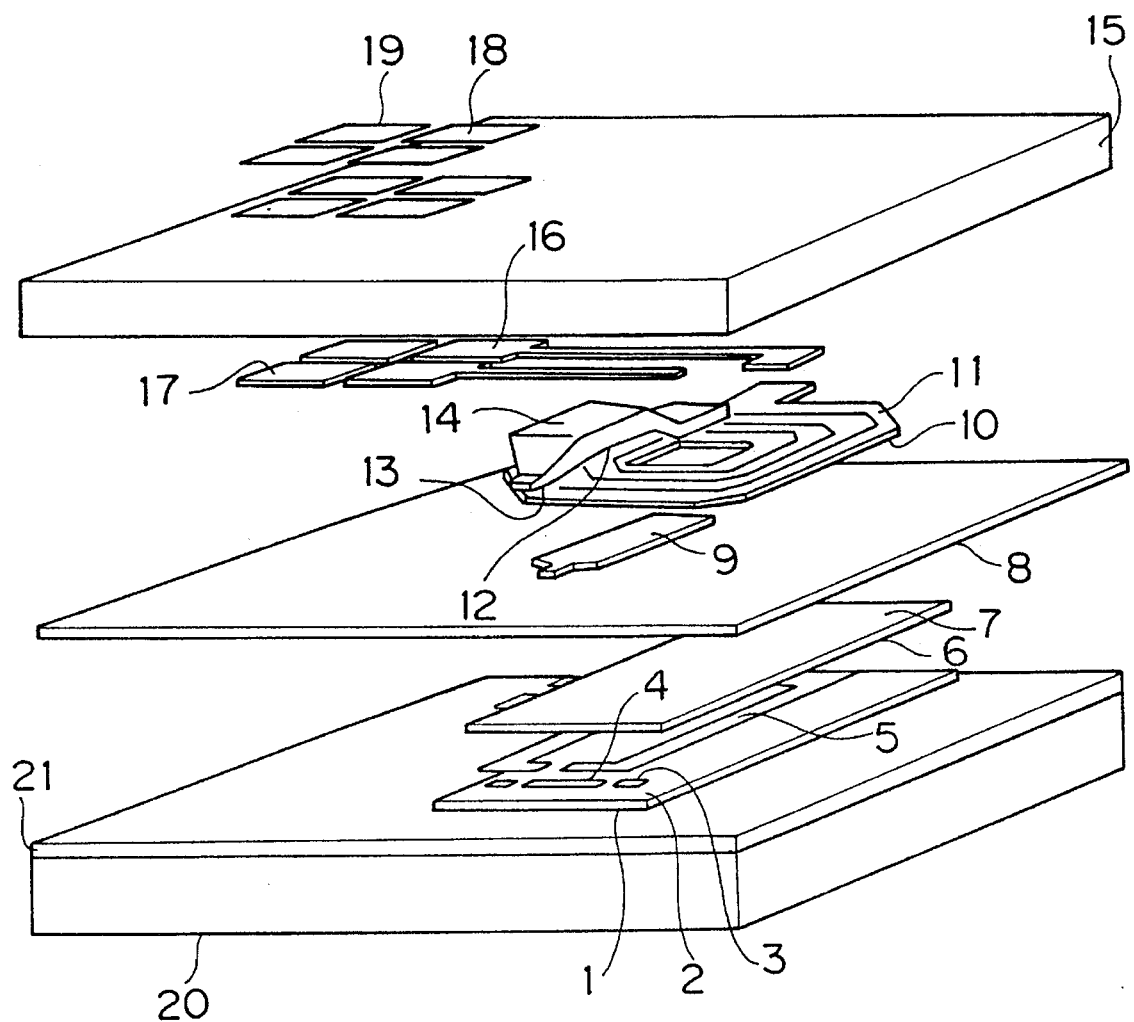
FIG. 9 is an exploded perspective view showing a multilayer structure of an MR thin film head according to the present invention.
Figure 10:
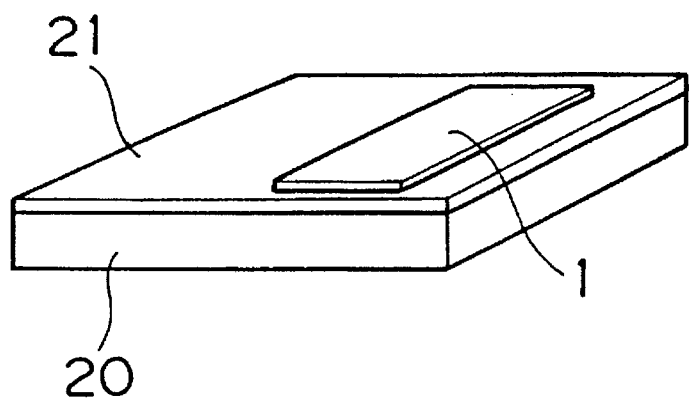
FIG. 10 is a perspective view showing a step of manufacturing the MR thin film head shown in FIG. 9.
Figure 11:
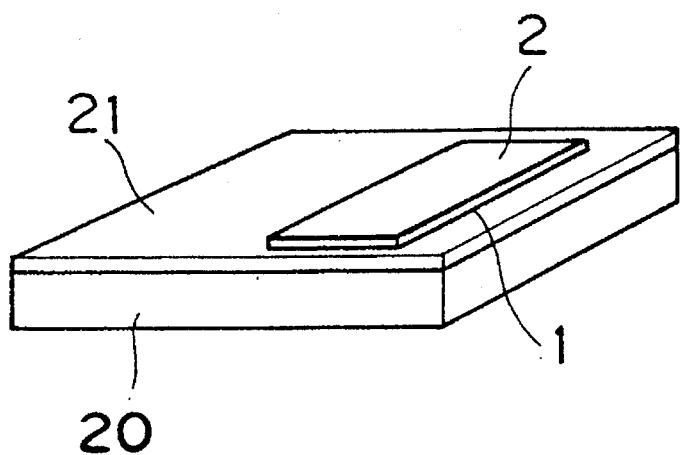
FIG. 11 is a perspective view showing another step of manufacturing the MR thin film head shown in FIG. 9.

FIG. 9 is an exploded perspective view showing an MR thin film head according to an embodiment of the present invention. FIGS. 10 to 16 are perspective views showing steps of manufacturing an MR element part of the MR thin film head shown in FIG. 9. Referring to FIG. 9, an insulating layer 21 is formed on a non-magnetic substrate 20. This insulating layer 21 is not indispensable to the present invention. Referring to FIG. 10, a lower shielding layer 1 is formed on a prescribed portion of the insulating layer 21. This lower shielding layer 1 is formed by sputtering an NiFe film to a magnetic field, for example, in a thickness of 1 μm. Referring to FIG. 11, a lower insulating layer 2 is formed on the lower shielding layer 1. This lower insulating layer 2 is formed by an $Al_2O_3$ film of 0.215 μm in thickness, for example, which is prepared by magnetron sputtering.

Figure 12:
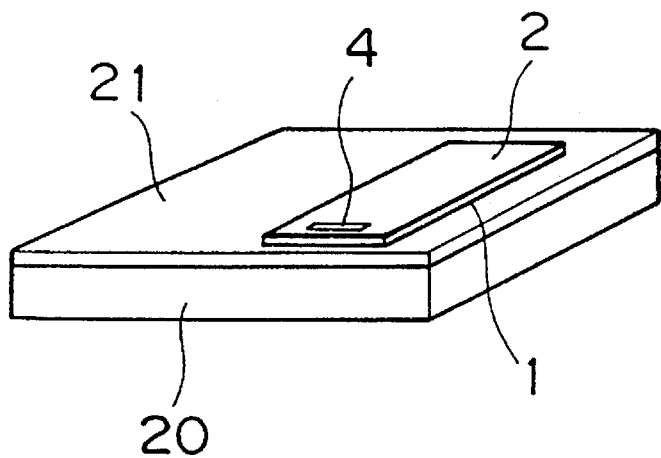
FIG. 12 is a perspective view showing another step of manufacturing the MR thin film head shown in FIG. 9.

Referring to FIG. 12, an MR element 4 is formed on a prescribed region of the lower insulating layer 2. The MR element 4 is prepared by forming an NiFe film of 0.03 μm thickness for serving as an MR thin film on an NiFeRh film and a Ta film of 0.027 μm and 0.02 μm in thickness, respectively, serving as bias films. The MR element 4 can be formed by sputtering in a magnetic field.

Figure 13:
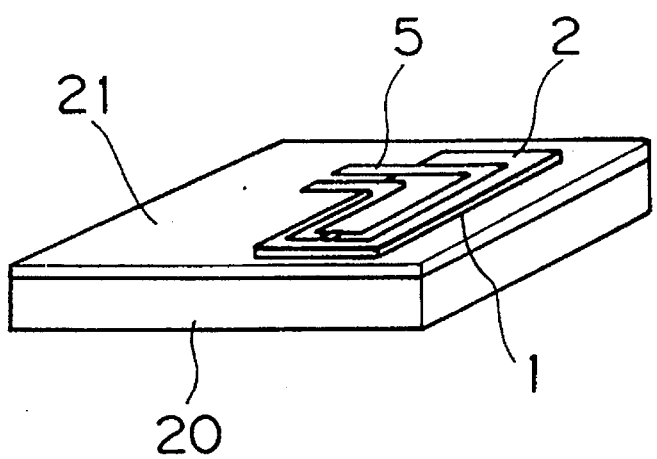
FIG. 13 is a perspective view showing another step of manufacturing the MR thin film head shown in FIG. 9.

Referring again to FIG. 9, magnetic domain control elements 3 consisting of CoPtCr films of 0.11 μm in thickness, for example, are formed on both sides of the MR element 4. Referring to FIGS. 9 and 13, a pair of electrodes 5 are formed on the MR element 4 and the magnetic domain control elements 3. These electrodes 5 are formed by stacking W and Cu films of 0.08 μm and 0.14 μm in thickness with each other. Both the MR element 4 and the electrodes 5 are formed by magnetron sputtering.

Figure 14:
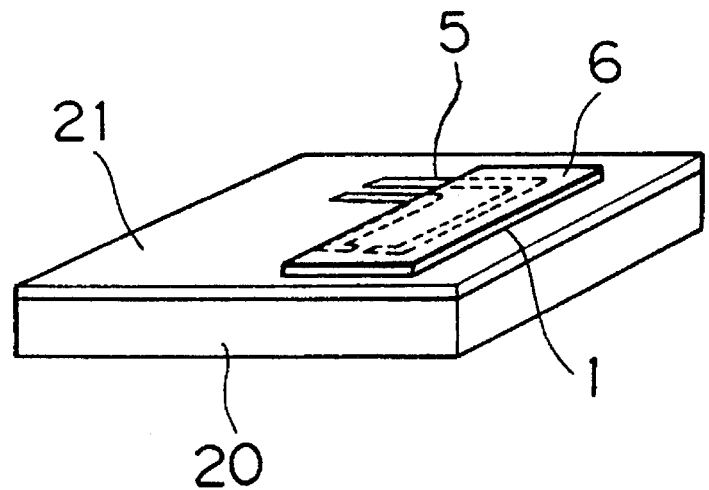
FIG. 14 is a perspective view showing another step of manufacturing the MR thin film head shown in FIG. 9.
Figure 15:
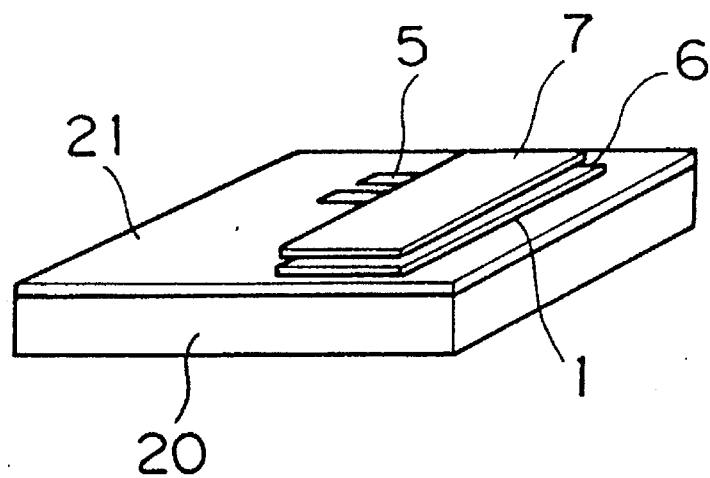
FIG. 15 is a perspective view showing another step of manufacturing the MR thin film head shown in FIG. 9.

Referring to FIG. 14, an upper insulating layer 6 consisting of an $SiO_2$ film of 0.12 μm in thickness, for example, is formed after formation of the electrodes 5. Referring to FIG. 15, an upper shielding layer 7 consisting of an NiFe film of 1 μm in thickness is formed on the upper insulating layer 6 by sputtering in a magnetic field, for example.

Figure 16:
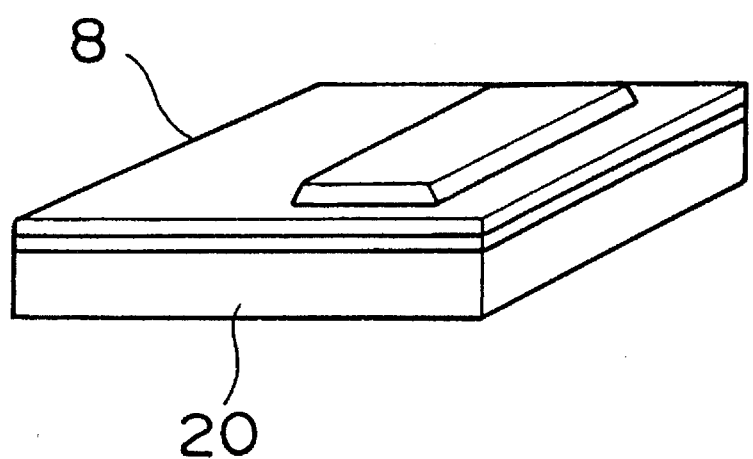
FIG. 16 is a perspective view showing another step of manufacturing the MR thin film head shown in FIG. 9.

Referring to FIG. 16, an isolation layer 8 consisting of an $SiO_2$ film of 3.5 μm in thickness, for example, is provided for forming an inductive magnetic head layer on the aforementioned components. This layer 8 is formed by magnetron sputtering, for example.

After the MR element part of the MR thin film head shown in FIG. 9 is formed in the aforementioned manner, an inductive magnetic head part is formed thereon. FIGS. 17 to 25 illustrate steps of forming the inductive magnetic head part.

Figure 17:
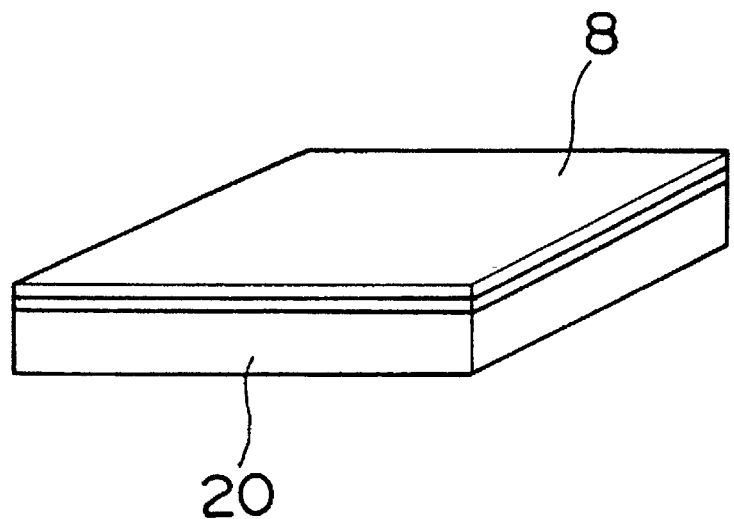
FIG. 17 is a perspective view showing a step of manufacturing an inductive magnetic head element of the MR thin film head shown in FIG. 9.
Figure 18:
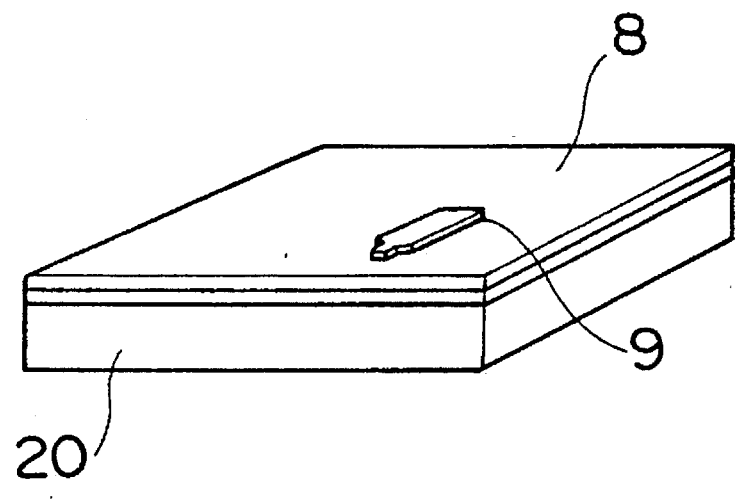
FIG. 18 is a perspective view showing another step of manufacturing the inductive magnetic head element of the MR thin film head shown in FIG. 9.

Referring to FIG. 17, the surface of the isolation layer 8 is flattened. Referring to FIG. 18, a lower core 9 is formed on a prescribed region of the isolation layer 8. The lower core 9 is formed by a soft magnetic film according to the present invention, which is prepared under the same film forming conditions as those for the Fe-N-O film shown to Table 1, in a thickness of 2 μm.

Figure 19:
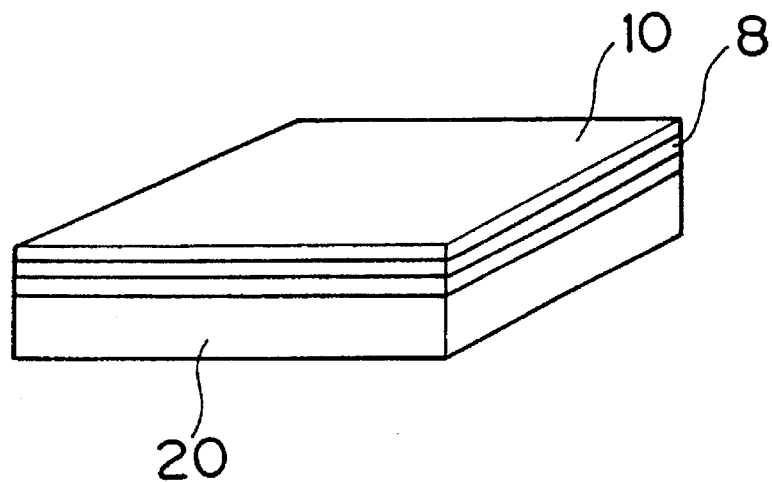
FIG. 19 is a perspective view showing another step of manufacturing the inductive magnetic head element of the MR thin film head shown in FIG. 9.

Referring to FIG. 19, a first insulating layer 10 consisting of an $SiO_2$ film of 3.5 μm in thickness, for example, is formed and flattened.

Figure 20:
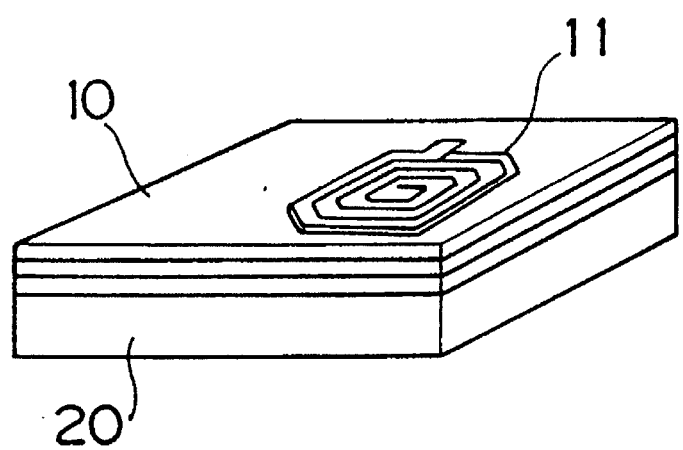
FIG. 20 is a perspective view showing another step of manufacturing the inductive magnetic head element of the MR thin film head shown in FIG. 9.

Referring to FIG. 20, a Ti/Cu/Ti multilayer film of 2 μm in thickness is formed on the first insulating layer 10 by magnetron sputtering, and patterned into the form of a coil 11.

Figure 21:
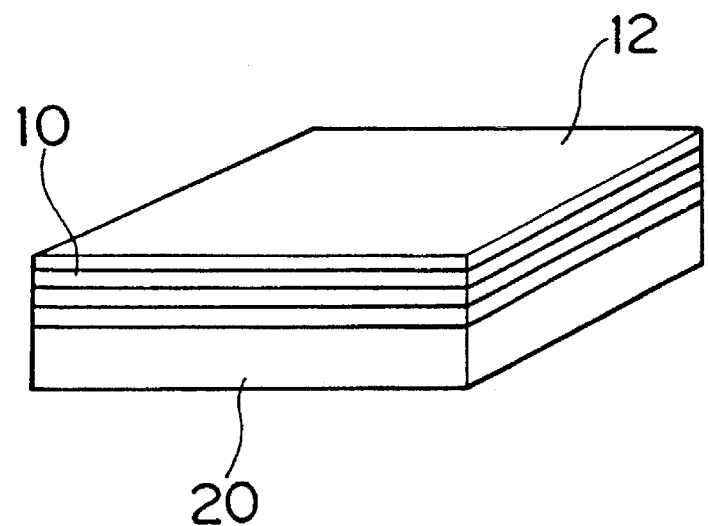
FIG. 21 is a perspective view showing another step of manufacturing the inductive magnetic head element of the MR thin film head shown in FIG. 9.
Figure 22:
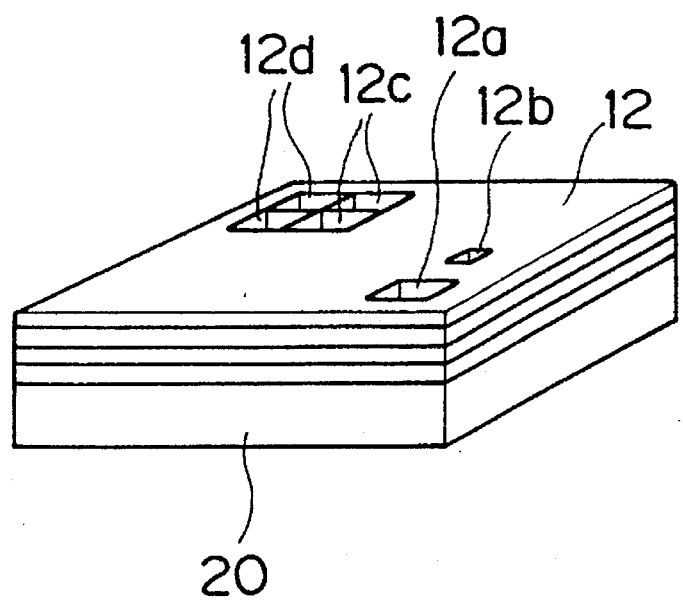
FIG. 22 is a perspective view showing another step of manufacturing the inductive magnetic head element of the MR thin film head shown in FIG. 9.

Referring to FIG. 21, a second insulating layer 12 consisting of an $SiO_2$ film of 3.5 μm in thickness, for example, is formed on the first insulating layer 10 and the coil 11, and flattened. Referring to FIG. 22, single through holes 12a and 12b and two pairs of through holes 12c and 12d for guiding electrodes are formed in the second insulating layer 12. The through holes 12a and 12b are formed to reach the lower core 8, while the pair of holes 12c for the electrodes are formed to reach terminal electrodes of the coil 11, and the other pair of 12d for the electrodes are formed to reach the electrodes 5 of the MR element part.

Figure 23:
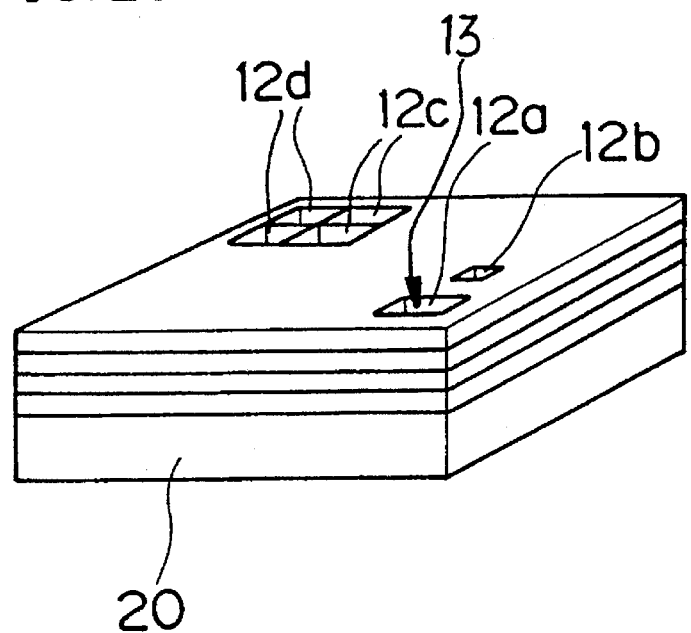
FIG. 23 is a perspective view showing another step of manufacturing the inductive magnetic head element of the MR thin film head shown in FIG. 9.

Referring to FIG. 23 and FIG. 9, a gap spacer film 13 is formed in the through hole 12a for defining a gap between end portions of the lower core 9 and an upper core 14 which is formed in a later step. This gap spacer film 13 is formed by an $SiO_2$ film of 0.4 μm in thickness, for example.

Figure 24:
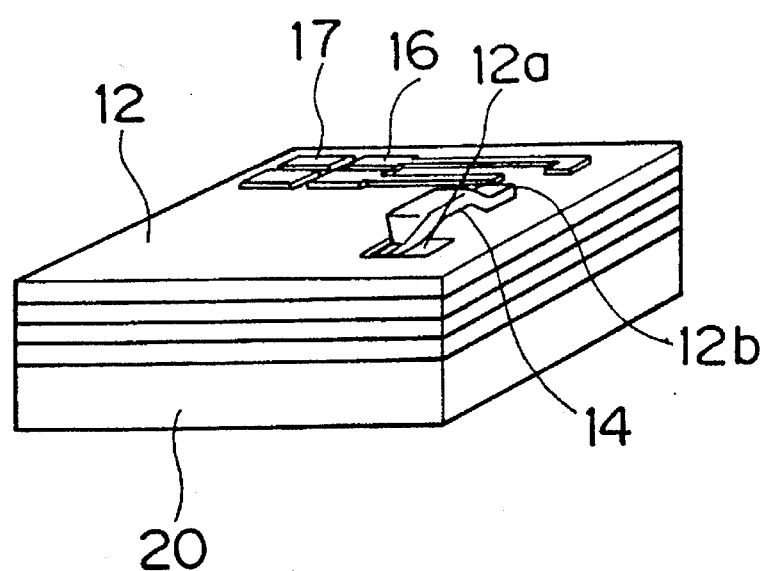
FIG. 24 is a perspective view showing another step of manufacturing the inductive magnetic head element of the MR thin film head shown in FIG. 9.

Referring to FIG. 24, the upper core 14 is formed to extend over the through holes 12a and 12b. An end of the upper core 14 passes through the through hole 12b, and is connected with the lower core 9. In the through hole 12a, on the other hand, another end of the upper core 14 is opposed to that of the lower core 9 through the gap spacer film. The upper core 14 can be formed by an Fe-N-O film of 3 μm in thickness, for example, under conditions similar to those for the Fe-N-O film shown in Table 1.

The upper core 14 is formed by sputtering in a magnetic field. Electrodes 16 and 17 are formed to pass through the pairs of holes 12c and 12d for the electrodes respectively.

Figure 25:
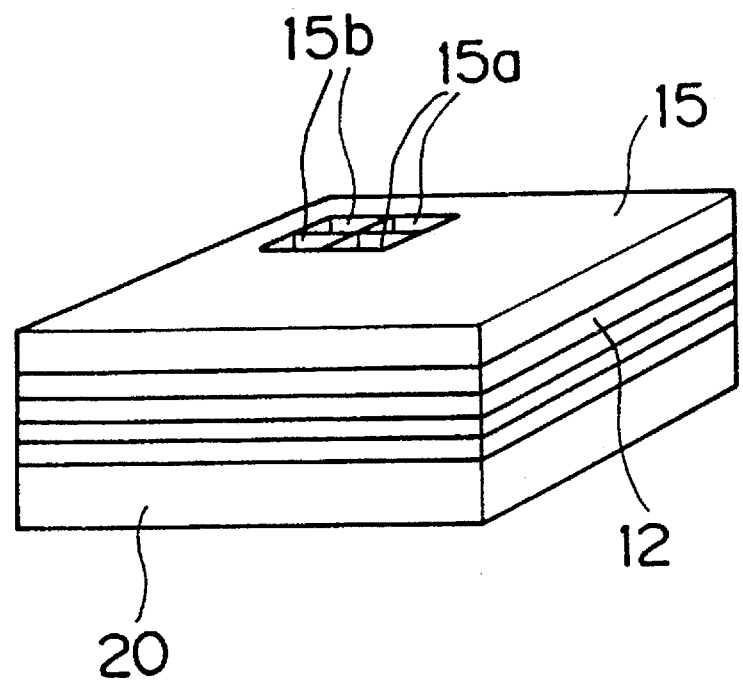
FIG. 25 is a perspective view showing another step of manufacturing the inductive magnetic head element of the MR thin film head shown in FIG. 9.

Referring to FIG. 25, a protective layer 15 consisting of an $Al_2O_3$ film of 30 μm in thickness, for example, is formed on the second insulating layer 12, the upper core 14, and the electrodes 16 and 17. Further, pairs of through holes 15a and 15b are formed in the protective layer 15 to reach the electrodes 16 and 17 respectively. In addition, referring to FIG. 9, terminal electrodes 18 and 19 are formed to be electrically connected with the lower electrodes 16 and 17 through the through holes 15a and 15b respectively.

The inductive magnetic head part of the MR thin film head shown in FIG. 9 is formed in the aforementioned manner.

Figure 26:
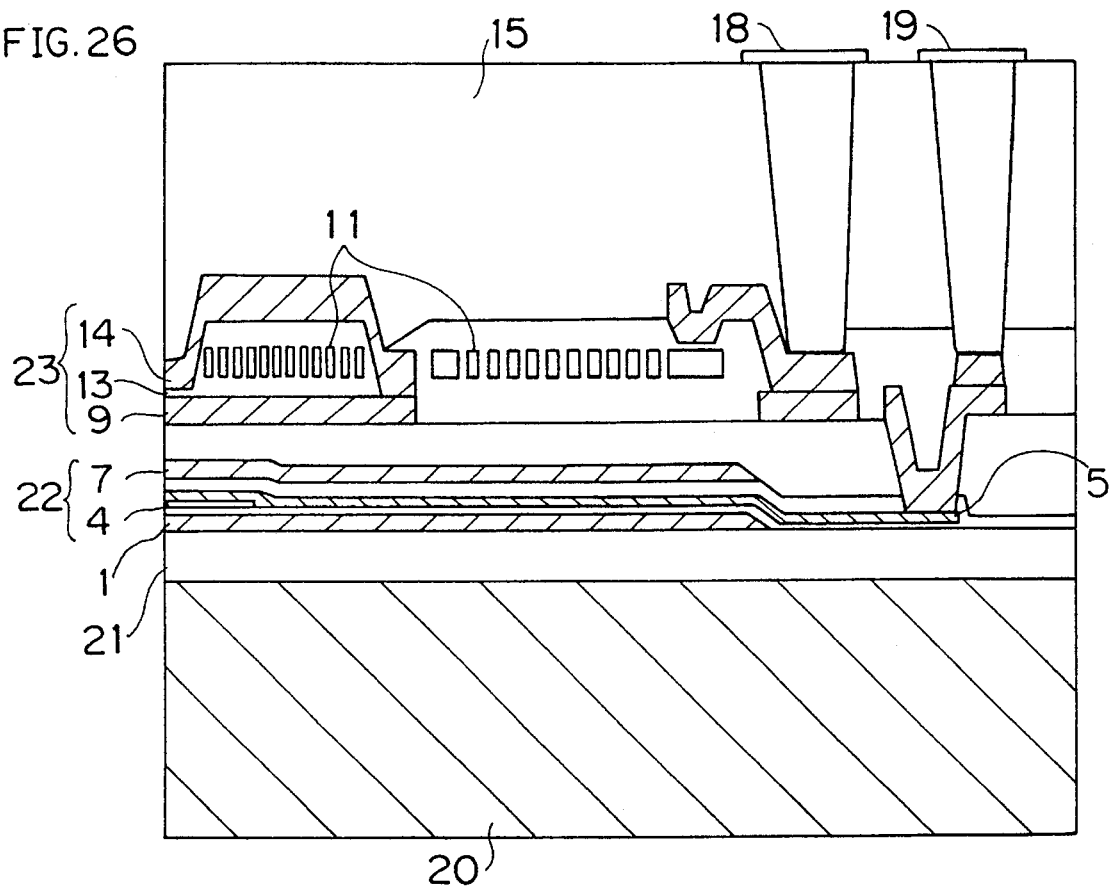
FIG. 26 is a longitudinal sectional view of the MR thin film head shown in FIG. 9.
Figure 27:
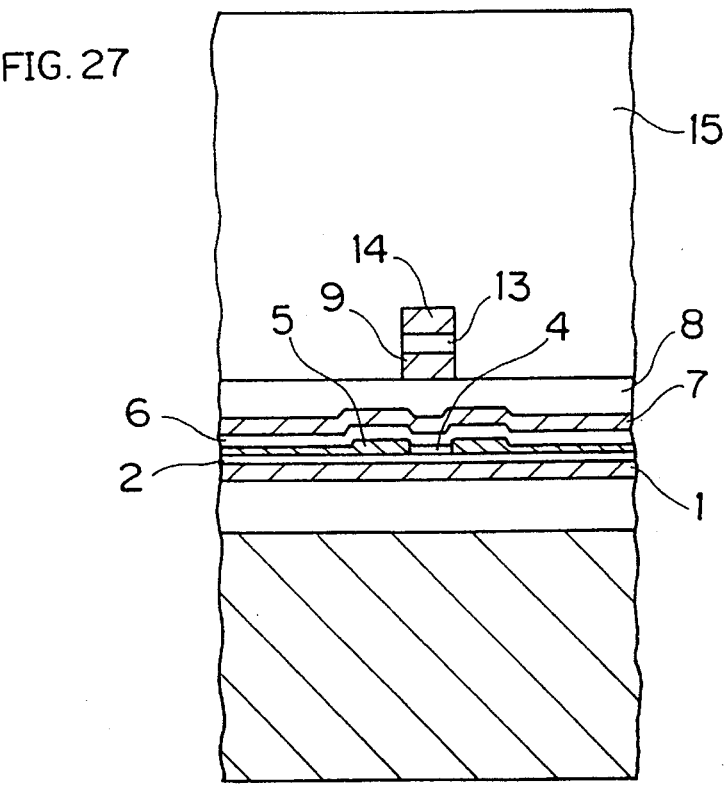
FIG. 27 is a cross sectional view of the MR thin film head shown in FIG. 9.

FIG. 26 is a longitudinal sectional view of the MR element part and the inductive magnetic head element part of the MR thin film head shown in FIG. 9. FIG. 27 is a cross sectional view of the MR thin film head including the MR element part along the opposite surface. As shown in FIGS. 26 and 27, this MR thin film head is formed by stacking an MR element part 22 and an inductive magnetic element part 23 on the substrate 20. The MR element 4 is held and shielded by the shielding layers 1 and 7 through the insulating layers 2 and 6. A gap spacer 13 is present between ends of the upper and lower cores 14 and 9, thereby defining a gap of the magnetic head.

In the MR thin film head having the structure shown in FIGS. 26 and 27, the inductive magnetic head element part 23 is formed on the MR element part 22 after the MR-element part has been found. If a high-temperature heat treatment is required in the steps of forming the inductive magnetic head element part 23, therefore, the MR element part 22 would be deteriorated due to such a high-temperature heat treatment. However, the inventive MR thin film head having the upper and lower cores 14 and 9 formed by the inventive soft magnetic alloy films exhibits low coercive force, high magnetic permeability and low magnetic striction in the as-prepared state without heat treatment. Therefore, the MR thin film head according to the present invention can be manufactured without a heat treatment step and thus without deterioration of the MR element part 23, and has properties which are suitable for a magnetic head for high density magnetic recording.

Figure 28:
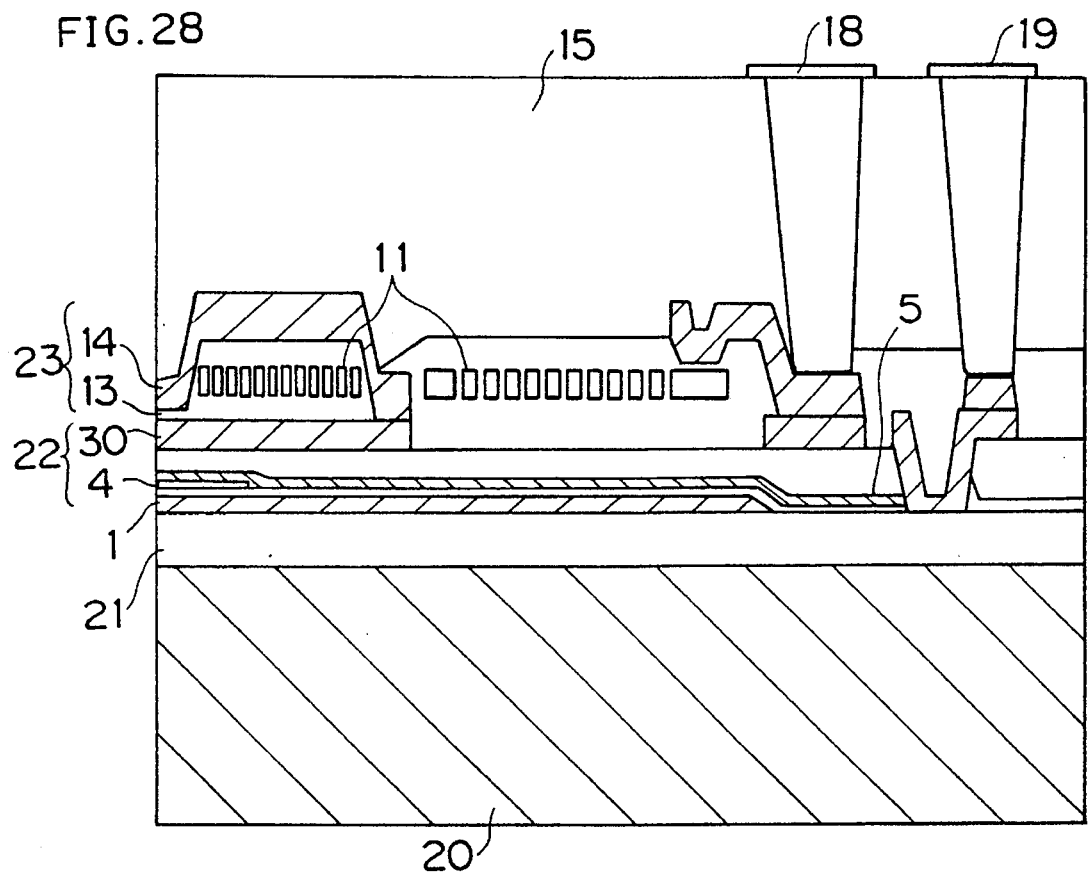
FIG. 28 is a longitudinal sectional view of an MR thin film head according to another embodiment of the present invention.
Figure 29:
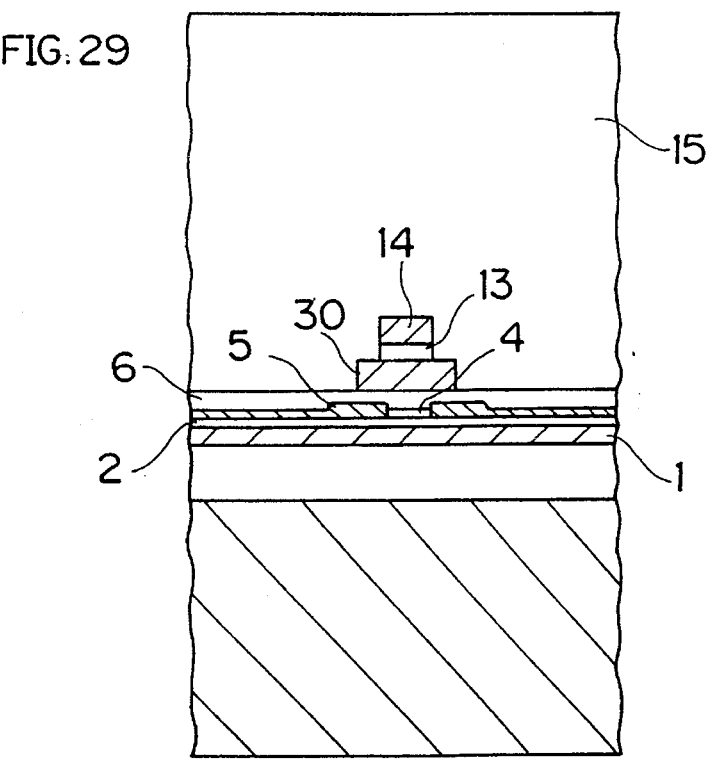
FIG. 29 is a cross sectional view of the MR thin film head shown in FIG. 28.

FIGS. 28 and 29 are longitudinal and cross sectional views showing an MR thin film head according to another embodiment of the present invention. This embodiment is applied to a merged type MR thin film head, in which an upper shielding layer of an MR element part 22 and a lower core of an inductive magnetic head element part 23 are implemented by a common part. Referring to FIGS. 28 and 29, a soft magnetic film 30 serving both as the upper shielding layer and the lower core is provided on an upper insulating layer 6 of the MR element part 22. A coil part 11 is formed on this soft magnetic film 30, and an upper core 14 is formed thereon. In this embodiment, the soft magnetic film 30 and the upper core 14 are formed by Fe-N-O films according to the present invention. A lower shielding layer 1 may also be formed by an Fe-N-O film according to the present invention.

According to this embodiment, it is possible to simplify the structure of the MR thin film head by implementing the upper shielding layer and the lower core by a common part.

A sample of the MR thin film head according to the embodiment shown in FIG. 9 was subjected to evaluation of overwritability and reproduction output. In this sample, each of the upper and lower cores 14 and 9 was formed by the Fe-N-O film shown in Table 1. For the purpose of comparison, a sample of an MR thin film head having upper and lower cores each consisting of the Fe-N film shown in Table 1 was subjected to evaluation of overwrite ratio and reproduction output. Table 3 shows the results.

TABLE 3

| Core Material | Overwrite Ratio | Reproduction Output (100 kFCI) |
|---|---|---|
| Fe—N—O | −42 dB | 700 μV |
| Fe—N | −39 dB | 550 μV |

As clearly understood from Table 3, the MR thin film head employing the Fe-N-O films as the core material in accordance with the present invention exhibits excellent overwritability and reproduction output.

Figure 30:
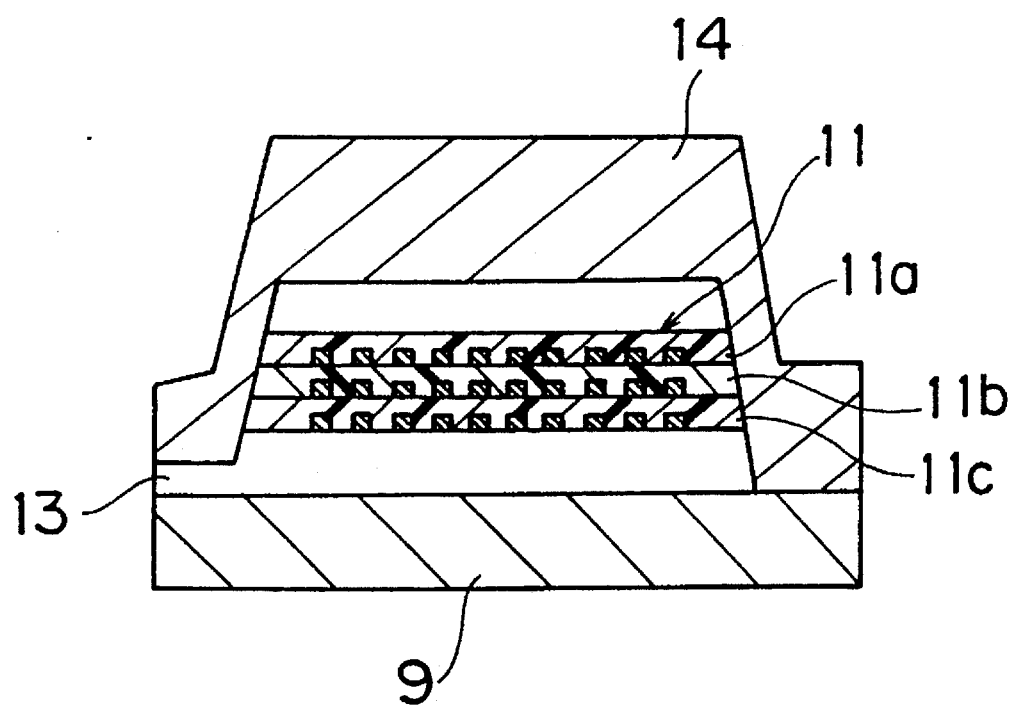
FIG. 30 is a sectional view showing a coil part of an inductive thin film magnetic head according to the present invention.

An inductive thin film magnetic head according to the present invention is adapted to record and reproduce information. Such an inductive thin film magnetic head can be prepared by directly forming the inductive magnetic head element part on the substrate in the MR thin film head shown in FIG. 9, without provision Of the MR element part. When the inductive magnetic head element part is adapted to record and reproduce information, its coil part may be in a multilayer structure with an increased number of turns. FIG. 30 is a sectional view showing a portion around a coil part 11 of a multilayer structure in such an inductive thin film magnetic head. Referring to FIG. 30, the coil part 11 is formed by stacking coil layers 11a, 11b and 11c with each other. The coil layers 11a to 11c are insulated by forming wire portions of the coil layers 11a to 11c corresponding to coils, and thereafter spin-coating the same with a solvent solution of organic resin for forming organic resin films. The organic resin can be a resin typically employed as a resist material in steps of fabricating a semiconductor device, for example. The resist material may be of the AZ series (by Hoechst Ltd.) such as AZ1300 series, for example.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A thin film head comprising:

an MR element for reproducing signals, and an inductive magnetic head element for recording signals having a coil part, and upper and lower cores arranged on upper and lower portions of said coil part respectively, wherein at least one of said upper and lower cores comprises a soft magnetic alloy film having a composition expressed by a formula of $Fe_xN_yO_z$ wherein each of X, Y and Z represents an atomic composition ratio, and having phases of $Fe_2O_3$, $Fe_4N$, $Fe_3N$ and $\alpha$-Fe, and wherein X, Y and Z in said composition formula are limited by the following relations:

$0.005 \leq Y \leq 0.12$ $0.005 \leq Z \leq 0.12$ $X+Y+Z=1.$

2. The thin film head in accordance with claim 1, wherein said $\alpha$-Fe has crystal grains with a grain size of not more than 200Å.

3. The thin film head in accordance with claim 1, wherein said soft magnetic alloy film exhibits a saturation magnetic flux density of at least 20 kG.

4. The thin film head in accordance with claim 1, wherein said soft magnetic alloy film exhibits a magnetic permeability of at least 3000 at 1 MHz.

5. The thin film head in accordance with claim 1, wherein said soft magnetic alloy film exhibits a saturation magnetic flux density of at least 20 kG, a magnetic permeability of at least 3000 at 1 MHz, and a coercive force of not more than 0.5 Oe, when said film is in an as-prepared state without a subsequent heat treatment.

6. The thin film head in accordance with claim 1, wherein said thin film head is manufactured by a process that uses no temperatures greater than 200° C., and wherein said soft magnetic alloy film is used in said thin film head in an as-prepared state without having been subjected to any temperature greater than 200° C.

7. An inductive thin film magnetic head for at least recording information, comprising:

a coil part, an upper core arranged on an upper portion of said coil part, and a lower core arranged on a lower portion of said coil part, wherein at least one of said upper and lower cores comprises a soft magnetic alloy film having a composition expressed by a formula of $Fe_xN_yO_z$ wherein each of X, Y and Z represents an atomic composition ratio, having phases of $Fe_2O_3$, $Fe_4N$, $Fe_3N$ and $\alpha$-Fe, and exhibiting a coercive force of not more than 0.5 Oe in an as-prepared state of said film without any subsequent heat treatment, and wherein X, Y and Z in said composition formula are limited by the following relations:

$0.005 \leq Y \leq 0.12$ $0.005 \leq Z \leq 0.12$ $X+Y+Z=1.$

8. The inductive thin film magnetic head in accordance with claim 7, wherein said coil part comprises a plurality of coil layers and a plurality of organic resin films stacked together with each other with said organic resin films arranged to insulate said coil layers from each other.

9. The inductive thin film magnetic head in accordance with claim 7, wherein said $\alpha$-Fe has crystal grains with a grain size of not more than 200Å.

10. The inductive thin film magnetic head in accordance with claim 7, wherein said soft magnetic alloy film exhibits a saturation magnetic flux density of at least 20 kG.

11. An inductive thin film magnetic head for at least recording information, comprising:

a coil part, an upper core arranged on an upper portion of said coil part, and a lower core arranged on a lower portion of said coil part, wherein at least one of said upper and lower cores comprises a soft magnetic alloy film having a composition expressed by a formula of $Fe_xN_yO_z$ wherein each of X, Y and Z represents an atomic composition ratio, having phases of $Fe_2O_3$, $Fe_4N$, $Fe_3N$ and $\alpha$-Fe, and exhibiting a magnetic permeability of at least 3000 at 1 MHz, and wherein X, Y and Z in said composition formula are limited by the following relations:

$0.005 \leq Y \leq 0.12$ $0.005 \leq Z \leq 0.12$ $X+Y+Z=1.$

12. The inductive thin film magnetic head in accordance with claim 11, wherein said soft magnetic alloy film exhibits a saturation magnetic flux density of at least 20 kG.

13. An inductive thin film magnetic head for at least recording information, comprising:

a coil part, an upper core arranged on an upper portion of said coil part, and a lower core arranged on a lower portion of said coil part, wherein at least one of said upper and lower cores comprises a soft magnetic alloy film having a composition expressed by a formula of $Fe_xN_yO_z$ wherein each of X, Y and Z represents an atomic composition ratio, having phases of $Fe_2O_3$, $Fe_4N$, $Fe_3N$ and $\alpha$-Fe, and exhibiting a saturation magnetic flux density of at least 20 kG, and wherein X, Y and Z in said composition formula are limited by the following relations:

$0.005 \leq Y \leq 0.12$ $0.005 \leq Z \leq 0.12$ $X+Y+Z=1.$

14. A thin film head comprising:

an MR element for reproducing signals, and an inductive magnetic head element for recording signals having a coil part, and upper and lower cores arranged on upper and lower portions of said coil part respectively, wherein at least one of said upper and lower cores comprises a soft magnetic alloy film having a composition expressed by a formula of $Fe_XN_YO_Z$ wherein each of X, Y and Z represents an atomic composition ratio, having phases of $Fe_2O_3$, $Fe_4N$, $Fe_3N$ and $\alpha$-Fe, and exhibiting a coercive force of not more than 0.5 Oe in an as-prepared state of said film without any subsequent heat treatment, and wherein X, Y and Z in said composition formula are limited by the following relations:

$0.005 \leq Y \leq 0.12$ $0.005 \leq Z \leq 0.12$ $X+Y+Z=1.$

15. The thin film head in accordance with claim 14, wherein said soft magnetic alloy film exhibits a saturation magnetic flux density of at least 20 kG.